July 7, 1925.
W. L. DIEMER
1,544,728
ATTACHMENT FOR JUVENILE VEHICLES
Filed March 5, 1924
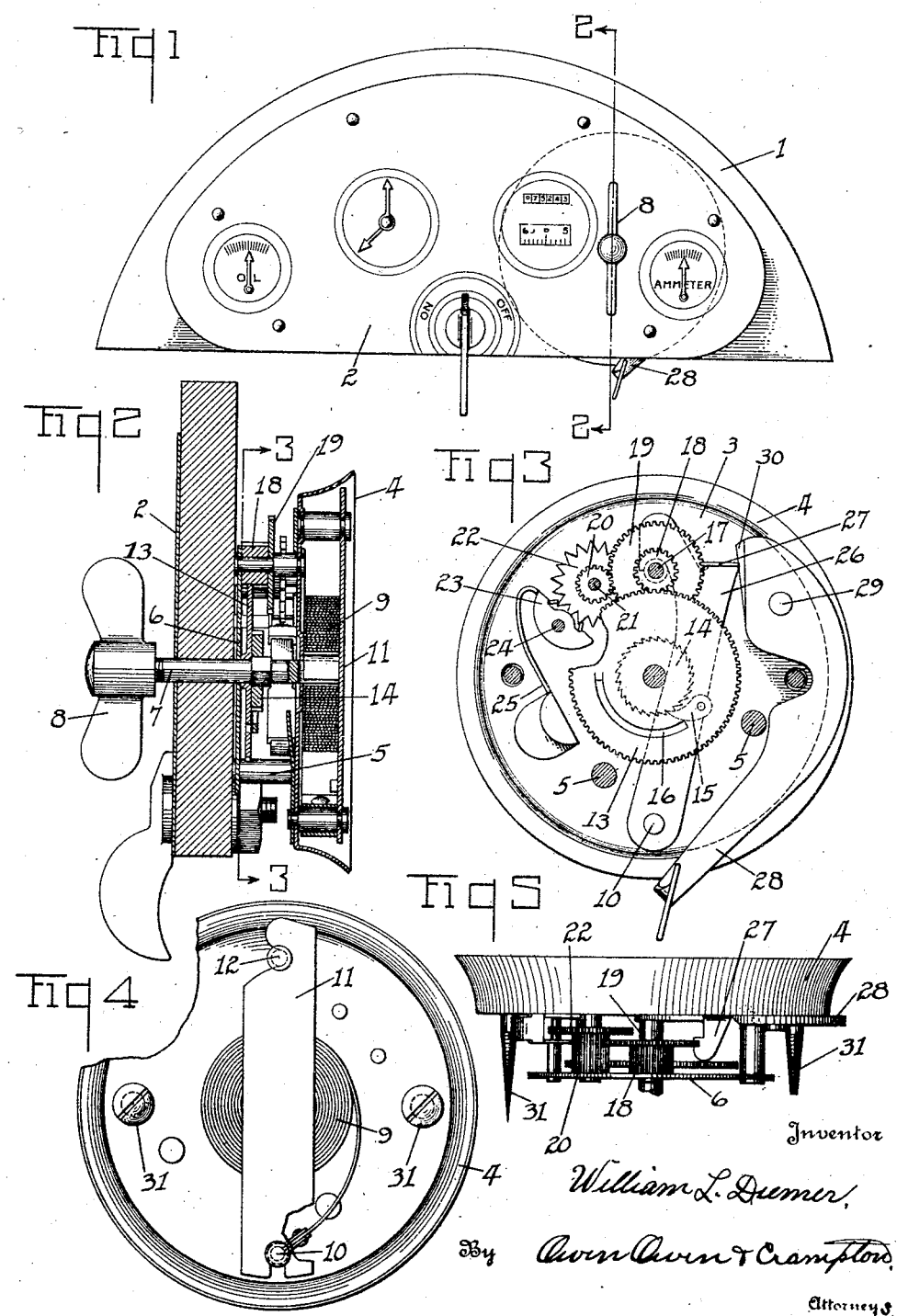
Inventor
William L. Diemer,
By Owen Owen & Crampton
Attorneys Patented July 7, 1925.

1,544,728

UNITED STATES PATENT OFFICE.

WILLIAM L. DIEMER, OF TOLEDO, OHIO, ASSIGNOR TO THE AMERICAN-NATIONAL COMPANY, OF TOLEDO, OHIO, A CORPORATION OF OHIO.

ATTACHMENT FOR JUVENILE VEHICLES.

Application filed March 5, 1924. Serial No. 696,979.

*To all whom it may concern:*

Be it known that I, WILLIAM L. DIEMER, a citizen of the United States, and a resident of Toledo, in the county of Lucas and State of Ohio, have invented new and useful Attachments for Juvenile Vehicles, which invention is fully set forth in the following specification.

This invention relates to juvenile vehicles and particularly to imitation automobiles.

It is found in practice that the addition of any feature to vehicles of this class which will cause them to imitate more closely regular automobiles tends to enhance their salability, and this is particularly true where the operation of some part can be indicated audibly in some manner.

The object of this invention is to enhance the commercial value and salability of imitation juvenile automobiles by the provision of simple and efficient manually controlled means which is automatically operable, upon the movement of a switch or control member, to emit a sound simulating that of a running engine.

The invention is fully described in the following specification, and one embodiment thereof is illustrated in the accompanying drawings, in which, Figure 1 is a rear elevation of an instrument board with the feature embodying the invention attached thereto; Fig. 2 is an enlarged section thereof on the line 2—2 in Fig. 1; Fig. 3 is a section on the line 3—3 in Fig. 2; Fig. 4 is a front elevation, with a part broken away, of the feature embodying the invention, and Fig. 5 is a top edge view thereof with a part broken away.

Referring to the drawings, 1 designates the instrument board of an imitation juvenile automobile having a sheet metal member 2 secured to its rear face, which is a side thereof adjacent to the driver, and stamped and painted to imitate the different instruments usually located on instrument boards.

Secured to the front side of the instrument board 1, in enclosed relation under the hood of the vehicle, is a spring actuated manually controlled mechanism, which, when released for free operation is adapted to make a rapid clicking sound imitating the running of an automobile engine, the clicking corresponding to and sounding very much like the rapid explosions of an engine. This mechanism comprises a disk-like body plate 3, having a forwardly turned edge flange 4, and having a plurality of posts 5 projecting therefrom and carrying a plate 6 at their rear ends in rearwardly spaced relation to the plate 3. A shaft 7 is journaled centrally in the plates 3 and 4 and projects at its rear end through an opening in the instrument board 1 and carries a wingnut 8 at the rear side of the instrument board to facilitate a turning of the shaft. The shaft 7 at the forward side of the disk 3 is encircled by a helical or clock spring 9, having its inner end fixed to the shaft and its outer end anchored to a post 10 on the disk 3. The spring 9 is held against the disk 3 by a cross-bar 11 releasably held at one end by the post 10 and at its other by a stud 12 on the disk 3.

A spur gear 13 is loosely mounted on the shaft 7 adjacent to the disk 6 and is caused to turn with the shaft in its spring actuated direction by the engagement of the teeth of a ratchet wheel 14 on the shaft with a pawl 15 on the gear, the pawl being yieldingly held in engagement with the ratchet wheel by a spring finger 16 on the gear. A shaft 17, which is carried by the plates 3 and 6 without the periphery of the gear 13, carries two pinions 18 and 19, one in mesh with the gear 13 and the other in mesh with a pinion 20 on a shaft 21, the arrangement of the gearing being such that a slow turning of the gear 13 will impart a rapid turning to the shaft 21. An escapement wheel 22 is mounted on the shaft 21 and engaged by an escapement finger 23 mounted for pivotal movements on a stud 24. It is evident that a turning of the escapement 22 will impart a rocking or vibratory movement to the finger 23, due to the tapered or V-shaped teeth of the wheel engaging the coacting projecting provisions of the finger. The rocking of the finger 23 and the engagement of the successive teeth of the wheel therewith causes a clicking sound which is augmented by providing the finger 23 with a weighted spring arm 25, and the clicking sound which is thus generated very closely resembles the noise of the running of an automobile engine.

A spring catch finger 26 is secured at one end to the inner side of the plate 3 by the adjacent end of the stud 10, and its opposite end extends across the side of the gear 13 adjacent to the plate 3 and is provided at its free end with a laterally bent lip portion 27, which normally engages in a registering notch between a pair of adjoining teeth of the pinion 19, thereby locking the mechanism against operation. A slight movement of the catch 26 crosswise of the pinion 19 will release the lip 27 from engagement with said pinion and permit an operating of the device. Such release is effected by a control lever 28, which is pivoted to the inner side of the disk 3 at 29 and is provided with a wedge-shaped edge portion 30 in position to engage the inner side of the free end portion of the catch finger 26, and move such finger to release the pinion 19 when the lower control end of the lever 28 is thrown to the right, in the present instance. When the lever is so thrown the mechanism will continue to operate until the lever is again moved to released position or the spring 9 has run down. The control end of the lever 28 projects below the instrument board 1 where it may be easily engaged for operation.

The mechanism employed is similar to and may be termed a clock mechanism, the spring being wound from the rear side of the instrument board by turning the wingnut 8 and the mechanism being released for operation by a movement of the control lever 28 to effect a release of the catch member 27 from locking engagement with the pinion 19.

The mechanism is secured, in the present instance, to the instrument board 1 by screws 31, which project through the disk 3 and thread into the instrument board.

It is evident that a device of this character in connection with a juvenile vehicle will be very attractive to children as the cause of the rapid clicking sound emitted upon the throwing of the lever 28 has a certain mystery about it, inasmuch as the mechanism is enclosed under the hood of the vehicle, and the noise emitted resembles that of a running engine.

I wish it understood that my invention is not limited to any specific construction, arrangement or form of the parts, as it is capable of numerous modifications and changes without departing from the spirit of the claims.

Having thus described my invention, what I claim as new and desire to secure by Letters Patent is:

1. In a juvenile imitation automobile the combination with a support of spring actuated mechanism mounted on one side thereof, said mechanism having escapement means for imparting a continuous clicking sound to simulate the sound of an automobile engine, means on the opposite side of said support for winding said mechanism, and manually operable control means accessible from the driver's seat, said means being operatively associated with said mechanism for starting and stopping the same.

2. In a juvenile vehicle of the class described, having an instrument board, a spring actuated mechanism adapted to be disposed beneath the hood of the vehicle and having an escapement means which emits a clicking sound when the mechanism is operated, a control means for the mechanism accessible from a point at the rear of the instrument board, and a spring winding means for said mechanism projecting through the instrument board and operable from the rear side thereof to wind the spring.

3. In a juvenile vehicle of the class described, an instrument board, a clock mechanism secured to the forward side of the board and having a winding means projecting through and accessible from the rear side of the board, and a control means for the mechanism having a control part projecting in accessible position below the board.

In testimony whereof, I have hereunto signed my name to this specification.

WILLIAM L. DIEMER.